No. 871,774. PATENTED NOV. 26, 1907.
P. H. BELITZ.
SHIP PROPULSION.
APPLICATION FILED DEC. 21, 1906.

2 SHEETS—SHEET 1.

Witnesses

Inventor
Paul Helmut Belitz
per.
Herbert Sefton Jones
Attorney

No. 871,774. PATENTED NOV. 26, 1907.
P. H. BELITZ.
SHIP PROPULSION.
APPLICATION FILED DEC. 21, 1906.

2 SHEETS—SHEET 2.

Witnesses

Inventor
Paul Helmut Belitz
per
Hubert Lefton Jones
Attorney.

ern:-

UNITED STATES PATENT OFFICE.

PAUL HELMUT BELITZ, OF STETTIN, GERMANY.

SHIP PROPULSION.

No. 871,774. Specification of Letters Patent. Patented Nov. 26, 1907.

Application filed December 21, 1906. Serial No. 348,974.

*To all whom it may concern:*

Be it known that I, PAUL HELMUT BELITZ, a subject of the Emperor of Germany, residing at No. 26 Lindenstrasse, Stettin, in the Kingdom of Prussia, Germany, have invented a new and useful Improvement in Ship Propulsion, of which the following is a specification.

The object of the present invention consists of a propelling mechanism for ships by means of wind motors in pairs fixed upon transverse shafts, said wind motors being supported by means of a frame forming part of the horizontal foot bearing. Hitherto known constructions of this kind are provided with a wind motor having only a single wind wheel or a series of single wheels placed tandem, which however is not suitable for regular ship propulsion because the power obtained thereby is not sufficient for the continuous propulsion of the ship and moreover the wind wheel is often blown down by reason of the storms occurring at sea. Further the supports of the motor and wind wheel as hitherto devised were designed primarily for wind motor constructions on land and were not adapted for sea requirements. Finally in driving by single wind motors, the dimensions must be very great and consequently the construction be attended with much cost and special difficulties. The object of my present application is to remove these drawbacks by the provision of wind motors acting in pairs upon a single shaft and suitably supported whereby I am enabled to develop almost double the power, and in consequence to propel the ship with much greater efficiency and certainty.

Figure 1:
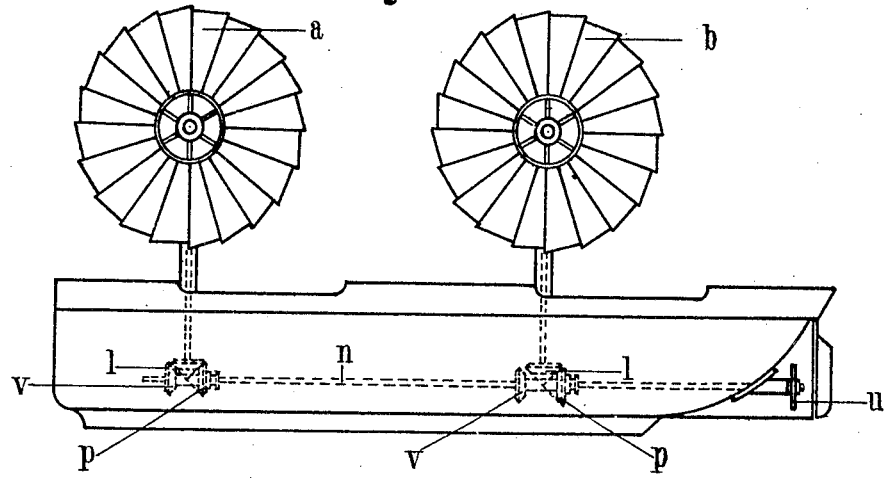
Figure 2:
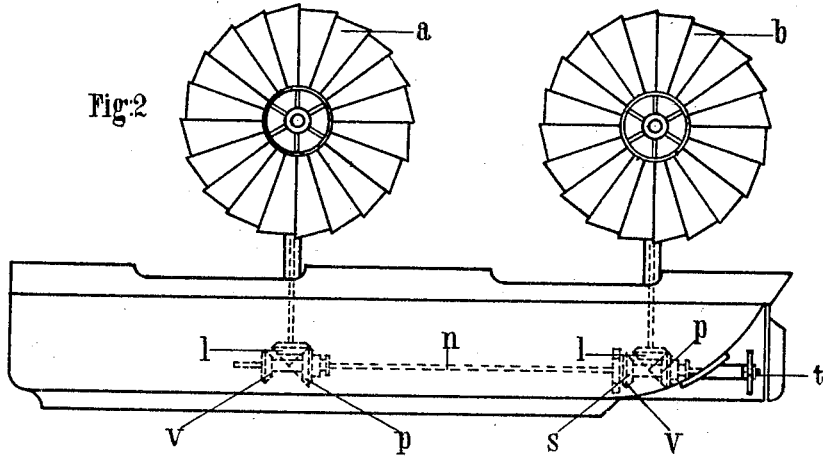
Figure 3:
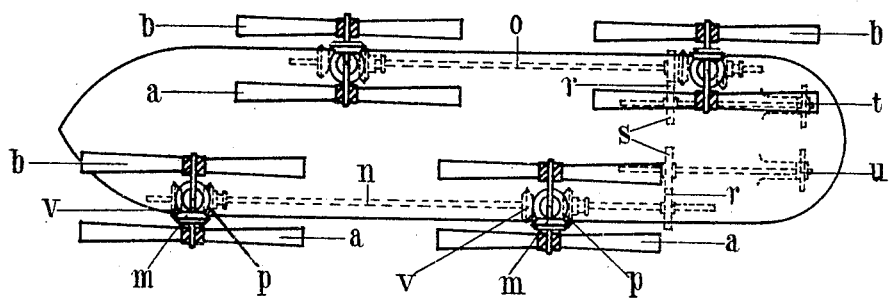
Figure 4:
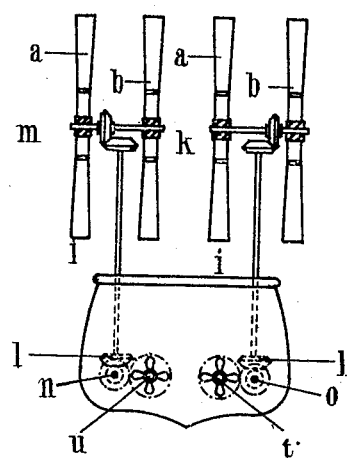
Figure 5:
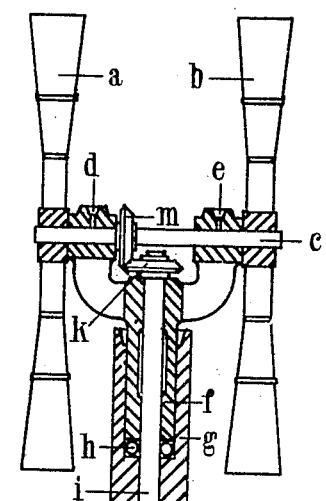
Figure 5:
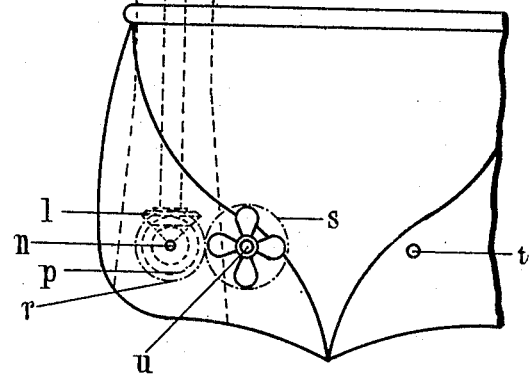

Referring to the accompanying drawing, Figure 1 shows a longitudinal section through a ship provided with a pair of wind motors and propeller mechanism. Fig. 2 shows the same longitudinal view with the wind motors driving two propellers on separate shafts. Fig. 3 is a plan view of Fig. 2. Fig. 4 shows an end elevation of Fig. 3. Fig. 5 shows a partial end elevation and part section of the vessel with the support forming the bearing in which the collar holding the vertical shaft revolves.

The ship provided with one or more propellers has set up on it a corresponding number of wind motors. For the purpose of the greater development of power two of these motors $a$ and $b$ are coupled together upon the common shaft $c$. The shaft $c$ is supported by the two bearings $d$ and $e$, the foot ends of which terminate in a common shaft $f$ which serves at the same time as a support for the driving shaft $i$. This shaft $f$ is supported on ball bearings $h$ in the end of the frame $g$ and this construction facilitates an easy adjustment of the wind motors. The driving shaft $i$ possesses gear wheels at each end from which the upper wheel $k$ takes up the power from the wheel $m$ placed upon the shaft $e$, while the lower wheel $l$ transmits the power by means of the wheel $o$ or $p$ to the shaft $n$ located in the ship's hold. The further transmission of the power to the propeller shafts $t$ and $u$ is effected through the gear wheels $r$ $s$.

The adjusting of the wind wheels or also of the entire set of wind motors is effected by means of any convenient device, which for the purpose of greater security against damage can be located in the interior of the vessel and operated from thence.

If more than one pair of motors are placed on one ship, then it is advisable to arrange them at both sides of the ship, whereby the use of more than one propeller screw facilitates access thereto and the transference of the power.

If it occurs that with my wind motors working in pairs one of the same becomes out of order, then the second motor can still remain operative, which in the case of the single wind motor mechanism hitherto known is entirely out of the question.

What I claim is:—

The combination with a vessel of pairs of wind motors placed side by side, a transverse shaft supporting each pair of motors and revolved thereby, vertical shafts adapted to transmit motion from the said transverse shafts, a plurality of horizontal shafts in operative connection with the vertical shafts and a propeller on the end of each horizontal shaft.

In testimony whereof I have signed my name to this specification in the presence of two subscribing witnesses.

PAUL HELMUT BELITZ.

Witnesses:
AUGUST. BELITZ,
KASIMIR PORCLAS, Junior.